Figure 1:
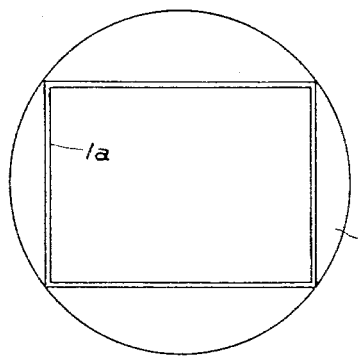

United States Patent Office 3,229,141
Patented Jan. 11, 1966

3,229,141
TELEVISION CAMERA TUBE STORAGE PLATE WITH RECTANGULAR STIFFENING RIDGE
Eric Douglas Hendry, Chelmsford, England, assignor to English Electric Valve Company Limited, London, England, a British company
Filed May 26, 1960, Ser. No. 31,853
Claims priority, application Great Britain, Aug. 27, 1959, 29,312/59
2 Claims. (Cl. 313—68)

This invention relates to television camera tubes and more specifically to camera tubes, such as image orthicon tubes, of the kind comprising a signal storing target structure having a very thin partially conducting storage target plate usually of glass.

One of the difficulties met with in image orthicon and similar television camera tubes of the kind referred to is that the storage plate forming part of the target structure is very apt to vibrate at its own natural frequency and/or at a frequency harmonically related thereto if the tube is subjected to mechanical shock or vibration or even strong acoustic waves. If such acoustically or mechanically induced vibrations occur there are corresponding vibrations in the storage compacitance and interference signals appear in the output signals from the tube. When the tube is employed in a conventional line scanning television system, these interference signals usually manifest themselves as dark horizontal bars in the reproduced pictures. The effect is generally known as microphony from an analogy with microphonic effect in an ordinary thermionic valve. The invention seeks to provide improved signal storing target structures for image orthicon and similar camera tubes which shall be economical and simple to make, which shall differ mechanically as little as possible from ordinary known target structures but which shall be, nevertheless, much improved as regards microphony when compared to known target structures. A further object of the invention is to provide improved target structures in which the expedients adopted for reduction of microphony shall also serve the purpose of accurately ensuring a required predetermined spacing between the storage plate of the target structure and the normally provided grid or mesh thereof.

According to this invention the very thin partially conducting storage plate of the signal storing target structure of a television camera tube of the kind referred to is formed with at least one stiffening web arranged to resist diaphragm-like vibration of the storage plate and thereby reduce microphony in the tube of which said structure forms a part.

Preferably there is a single stiffening web arranged to frame a rectangular area substantially corresponding to the useful area of the target structure.

The stiffening web or webs may consist of a ridge or ridges formed in the material (normally glass) of the storage plate itself and rising out of the general plane thereof. However, the said web or webs may consist of strips of material matched with that of the storage plate and sealed thereto so as, in effect, to thicken the same at the web or webs. In a further form of construction the storage plate is dished so as to have an inner part in one plane and an outer part in an adjacent substantially parallel plane, a stiffening web being constituted by the wall joining the two said parts.

Preferably the height of the stiffening web or webs is chosen to be equal to the spacing required between that part of the storage plate corresponding to the useful picture area and the normally provided mesh of the target structure so that the web or webs serve not only to reduce microphony by reducing diaphragm-like vibration of the storage plate, but also to determine and maintain the required plate-mesh spacing over the said useful picture area.

Figure 2:
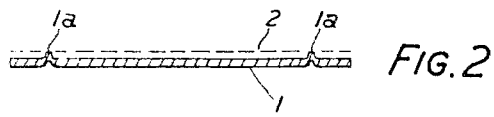
Figure 3:
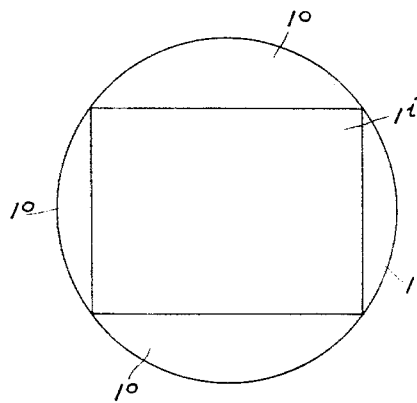
Figure 4:
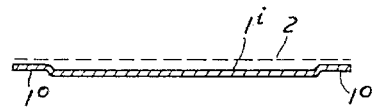

The invention is illustrated in the accompanying drawings in which FIGS. 1 and 2 are mutually perpendicular schematic views of one target structure in accordance with the invention and FIGURES 3 and 4 are similar views of a modification.

For the sake of clarity and simplicity of drawing the normally provided grid or mesh of the target structure is omitted from the face views of FIGURES 1 and 3, but is shown in the section views of FIGURES 2 and 4. It is to be understood that the drawings are purely schematic and by no means to scale. In particular the thickness of the glass storage target plate is necessarily much exaggerated.

Referring to FIGURES 1 and 2, the signal storing target structure therein shown consists of a very thin glass storage plate 1 and a spaced mesh 2 which appears in FIGURE 2 only. The useful picture area of the structure is the area within the rectangle which apepars in FIGURE 1. In order to prevent diaphragm-like vibration of the glass membrane 1 and consequent microphony, a rectangular stiffening web is formed in the glass storage plate. This stiffening web, which is marked 1ª in FIGURES 1 and 2, is in fact the rectangular frame which surrounds the useful picture area and appears in FIGURE 1 as such. It is formed merely by moulding a ridge in the glass storage plate when manufacturing the same to constitute the rectangular web. The height of the ridge is chosen to accord with the required spacing between the mesh 2 and the part of the storage plate inside the web, i.e., the useful picture area. To quote a practical figure, this height might be 0.002".

In a modification which is not illustrated, instead of forming the rectangular frame as a ridge moulded in the storage plate, it may be constituted by a separate rectangular frame made of a glass matched to the glass of the storage plate and having the required thickness (of 0.002" in the example above given). This separate frame of glass is of the same shape and size as the ridge 1ª of FIGURES 1 and 2 and is simply placed in position on the glass storage plate and sealed thereto in any convenient way.

In the modification shown in FIGURES 3 and 4, the glass storage plate is dished so as to consist of an outer portion 1º and an inner portion 1ⁱ which lie in parallel planes, the central portion of the storage plate being a short distance—say 0.002"—below the outer portion and being joined thereto by the substantially vertical walls provided by dishing. The inner portion is rectangular and corresponds with the useful picture area. The substantially vertical wall joining the inner and outer portions of the storage plate thus constitutes a rectangular stiffening web giving the required stiffening against microphony. The mesh 2 lies across the dished storage plate and is thus spaced from the useful picture area by the height of the web, i.e., the joining wall between parts 1º and 1ⁱ.

I claim:

1. A television camera tube comprising a signal storing target structure having a very thin partially conducting storage plate and a conducting mesh closely spaced, over the useful target area, from said storage plate, said storage plate having integral therewith at least one stiffening web of the same material as said storage plate, the stiffening web being formed as a rectangular ridge in the material of the storage plate which frames the useful target area and is arranged to resist diaphragm-like vibration of the storage plate.

2. A tube as claimed in claim 1 wherein the height of the stiffening web is chosen to be equal to the spacing required between that part of the storage plate corresponding to the useful picture area and the normally provided mesh of the target structure so that the web serves not only to reduce microphony by reducing diaphragm-like vibration of the storage plate, but also to determine and maintain the required plate-mesh spacing over the said useful picture area.

References Cited by the Examiner

UNITED STATES PATENTS

| | | | |
|---|---|---|---|
| 2,582,843 | 1/1952 | Moore | 313—89 |
| 2,681,377 | 6/1954 | Smithers | 161—118 X |
| 2,923,843 | 2/1960 | Turk | 313—68 |
| 2,957,140 | 10/1960 | Harris | 313—89 X |

FOREIGN PATENTS 814,124   9/1959   Great Britain.

GEORGE N. WESTBY, *Primary Examiner.*

RALPH G. NILSON, *Examiner.*